April 5, 1927.
C. F. AMES
1,623,083
VACUUM PRODUCING APPARATUS
Filed Oct. 22, 1925    2 Sheets-Sheet 1
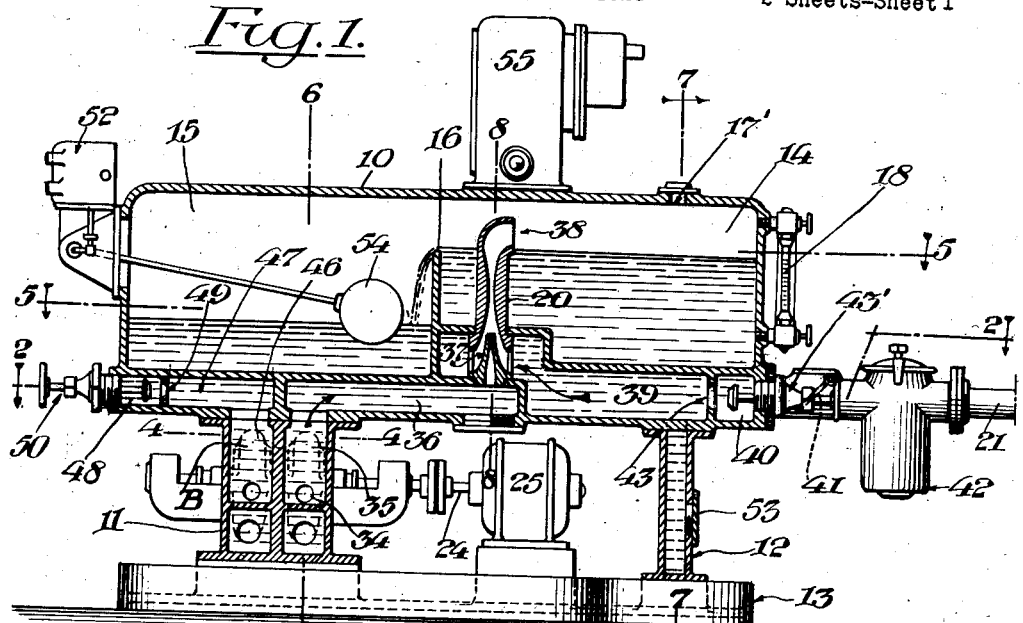
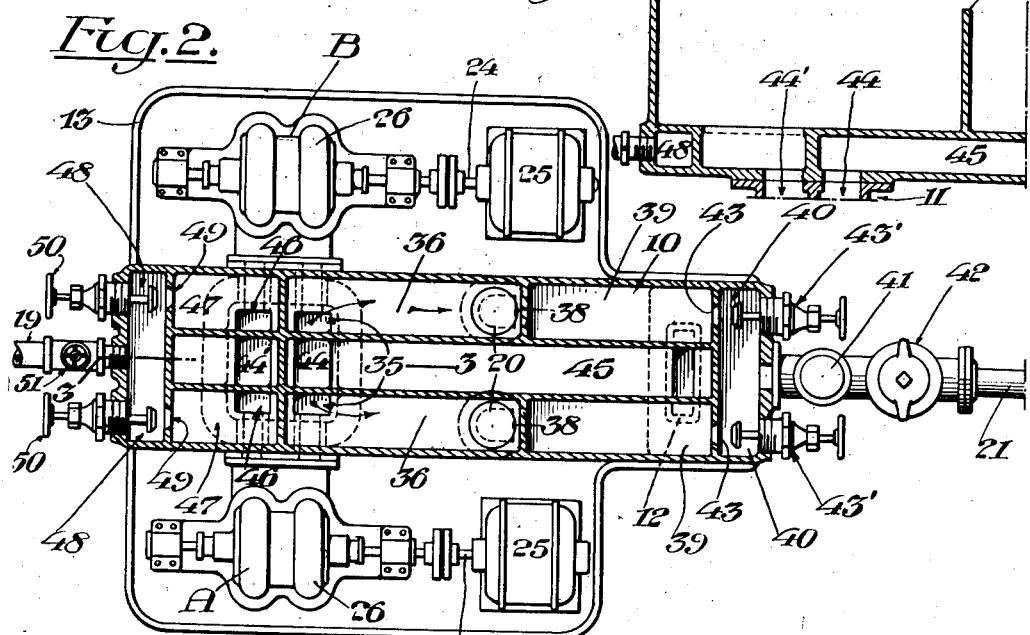
Inventor
Charles F. Ames
by his Attorney
John R. Nolan April 5, 1927.

C. F. AMES 1,623,083

VACUUM PRODUCING APPARATUS

Filed Oct. 22, 1925 2 Sheets-Sheet 2

Inventor
Charles F. Ames
by his Attorney
John R. Nolan

Patented Apr. 5, 1927.

1,623,083

UNITED STATES PATENT OFFICE.

CHARLES F. AMES, OF BROOKLYN, NEW YORK, ASSIGNOR OF ONE-FIFTH TO ALPHONSE H. E. BERCHEM AND ONE-FIFTH TO HARRY S. SCHANCK, BOTH OF NEW YORK, N. Y.

VACUUM-PRODUCING APPARATUS.

Application filed October 22, 1925. Serial No. 64,086.

This invention relates to a vacuum producing apparatus for use more particularly in connection with or as a part of a vacuum steam heating system for the purpose of effecting the removal of fluid accumulations, as air and water of condensation, from the radiators, and progressively delivering the surplus or accumulated water to a boiler feed pipe or the like.

The object of my invention is to provide an apparatus of simple, durable and efficient construction whereby a vacuum or partial vacuum effective to exhaust the air and water of condensation from the system is produced by the energy of a forced circulation of water, which water, together with the entrained air and water of condensation, is delivered into a receiving chamber within which the air is separated from the water and permitted to escape, and within which chamber a uniform water level is maintained without the employment of float actuated valves or other moving control devices.

Another object of my invention is to provide an apparatus of such construction that the effective capacity thereof can be varied to adapt it to different requirements of service.

With these and other objects in view my invention comprises novel features of construction and combinations of parts which will be hereinafter described and claimed.

In the drawings—

Figure 1 is a longitudinal vertical section of a vacuum producing apparatus embodying a preferred form of my invention.

Fig. 2 is a horizontal section of the apparatus, as on the line 2—2 of Fig. 1.

Fig. 3 is a partial vertical section of one end of the tank, as on the line 3—3 of Fig. 2.

Fig. 4 is a horizontal section of a tank supporting standard, as on the line 4—4 of Fig. 1.

Fig. 8 is a like section, as on the line 8—8 of Fig. 1.

Fig. 9 is a vertical section of a twin rotor centrifugal pump hereinafter referred to.

Figure 5:
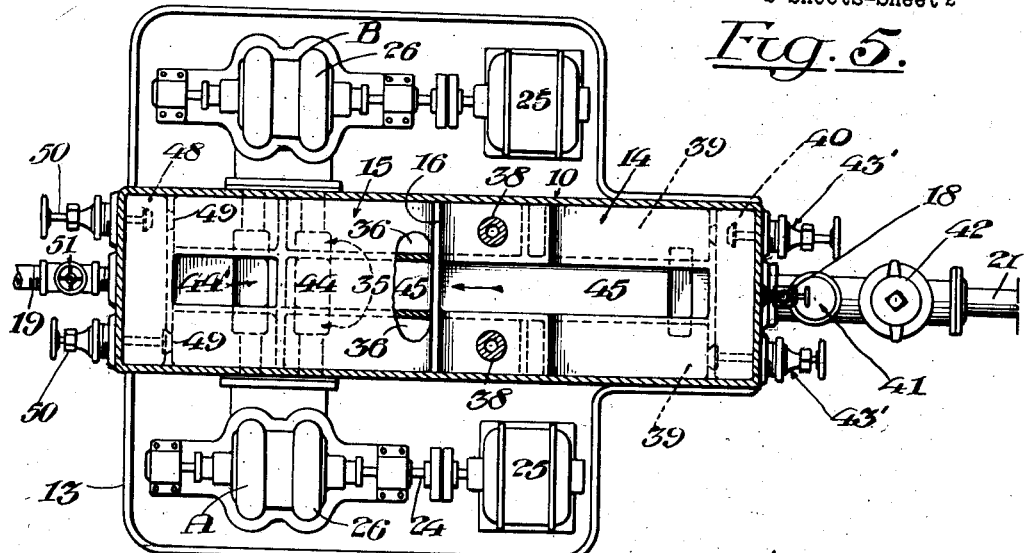
Fig. 5 is a horizontal section of the apparatus, as on the line 5—5 of Fig. 1.
Figures 6, 7:
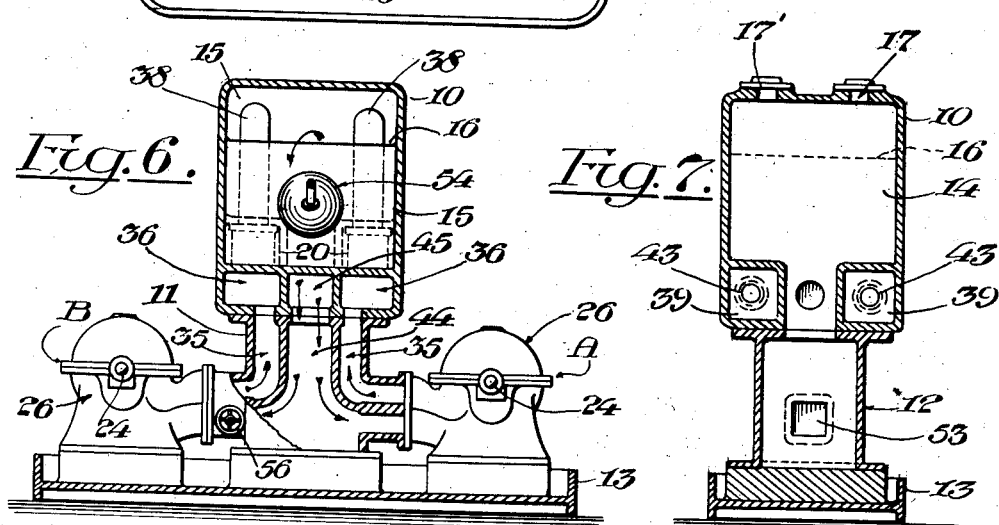
Fig. 6 is a transverse vertical section, as on the line 6—6 of Fig. 1.
Fig. 7 is a similar section, as on the line 7—7 of Fig. 1.
Figures 8, 9:
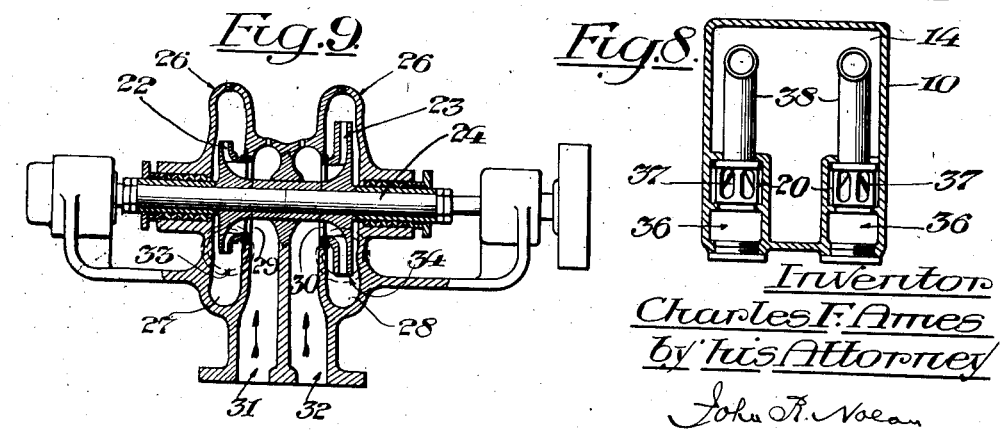

Referring to the drawings, 10 designates a horizontally-disposed tank supported by two spaced-apart standards 11, 12, rising from a suitable bed 13. This tank is preferably a cast-iron structure divided into two capacious compartments 14, 15 by means of a vertical partition or baffle 16 which terminates at a defined level below the top of the tank, as clearly seen in Fig. 1. This baffle may be cast integral with the tank or be a separate member properly mounted therein. The compartment 14 constitutes a primary chamber for the reception and separation of air and water of condensation withdrawn from a vacuum steam heating system, and the compartment 15 constitutes a secondary chamber into which the water contents of the chamber 14 overflows as rapidly as the added water of condensation raises the level of the liquid above the top of the baffle. The tank is provided above the chamber 14 with a filler hole 17 through which, preparatory to the operation of the apparatus, make-up water can be supplied to the chambers until level with the top of the baffle, and the tank is also provided with a suitably-disposed vent cap 17' for the escape of the air which is delivered from the heating system to the chamber 14 during the operation of the apparatus. The tank is preferably equipped at one end with a water gauge 18 which, being suitably connected with the chamber 14, indicates the water level in the latter.

The chambers 14, 15 are independently connected with suitable centrifugal pumps, or pump units, operative to effect a circulation of water through the chamber 14 and also to withdraw the water from the chamber 15 and deliver it to a boiler feed pipe, as 19. The circulation path for the chamber 14 includes an ejector or ejectors 20 having operative communication with the return line 21 from a vacuum steam heating system, so that the energy of the water in its passage through the ejector or ejectors is effective to create and maintain in the return line a partial vacuum sufficient to remove the accumulations of air and water of condensation from the system and discharge them into the chamber 14, as will presently appear.

In the particular construction herein illustrated two twin rotor centrifugal pumps A, B are employed, each of which pumps includes an element operative to establish the circulation through the chamber 14, and an element operative to remove the water from the chamber 15; but it is to be understood that separate pumps, or a single twin pump, may be employed, if desired, without departure from my invention. In any case the number or the capacity of the pumps will depend upon the requirements of the system.

Since the construction of the twin rotor pump herein illustrated forms the subject of a separate application for patent it needs no detailed description herein. Suffice it to say that each pump comprises two rotors or impellers 22, 23, of proper relative capacity for their respective duties, mounted on a common shaft 24 which is driven by a suitable motor 25. The pump housing 26 is a structure in which are formed the respective impeller chambers 27, 28, the eyes or ingress ports 29, 30 to the respective impellers 22, 23, the inlet passages 31, 32 to the respective ports, and the discharge passages 33, 34 from the respective impeller chambers.

The discharge passage 34 from the respective impeller chambers 28 of the pumps communicate with vertical conduits 35 in the standard 11, which conduits, in turn, communicate with two longitudinally extending conduits 36 formed in the bottom of the tank at its respective sides. The conduits 36 terminate beneath the chamber 14, and respectively communicate with ejectors 20 which comprise conical jet nozzles 37 entering the lower laterally perforated ends of upstanding combining tubes 38 supported in the tank structure. These tubes 38 rise within the chamber 14 and discharge at or above the normal level of the water contained in such chamber; the basal or inlet portions of the tubes being in communication with longitudinal conduits 39 formed in the bottom of the tank structure. These conduits 39 lead to a common transverse connecting passage 40 at one end of the tank, and to this passage is operatively connected, through an interposed combined check valve 41 and strainer structure 42, the return line 21 from the system to be exhausted. The passage 40 communicates with the conduits 39 through ports 43, provided with suitable hand valves 43' which are mounted in the adjacent end head of the tank and are operative to open or close the ports, or either of them, as desired.

The inlet passages 32 to the respective impeller chambers 28 of the pumps A and B are arranged in communication with a common vertical conduit 44 in the standard 11, which conduit leads to a central conduit 45 formed below the bottom of the secondary chamber 15 and extending beneath the baffle and along the bottom of the primary chamber. Hence during the operation of the pumps a continuous circulation of water to and through the chamber 14 is effected.

The inlet passages 31 to the respective impeller chambers 27 of the pumps are arranged in communication with a common vertical conduit 44' in the standard 11 which conduit leads to a port formed in the bottom of the secondary chamber 15.

The discharge passages 33 from the impeller chambers 27 communicate with vertical conduits 46 in the standard 11, which conduits, in turn, lead to two longitudinally extending conduits 47 formed in the bottom of the tank at the respective sides of the chamber 15, and communicating with a transverse passage 48 at the adjacent head of the tank structure. The conduits 47 preferably communicate with the conduit 48 through ports 49, provided similarly to the ports 43 with suitable hand valves 50 which are mounted in the adjacent head of the tank and are operative to open or close the ports 49, or either of them, as desired. The boiler feed pipe 19 communicates with the passage 48 through an interposed check valve 51 preferably fitted in the adjacent head of the tank structure.

Assuming the chambers 14 and 15 to be supplied with make-up water to the level of the top of the baffle, it will be seen that the submerged impellers 23 when in operation will effect a continuous circulation of the water contained in the chamber 14, which water is forced through the respective conduits 35, 36 and into and through the ejectors at a predetermined velocity, and escapes thence through the flaring heads of the tubes 38 into the upper portion of the chamber 14. The energy of the liquid in its restricted passage through the ejectors creates and maintains in the return line 21 a partial vacuum effective to withdraw the accumulations of air and water from the system and discharge them into the chamber 14 as above mentioned. The air delivered to the chamber 14 escapes through the vent cap 17 in the top of the tank structure, while the water of condensation mixes with and variably increases the volume of the liquid contents of the chamber 14, as previously stated. By the provision of the adjacent secondary chamber 15 and the interposed fixed baffle 16, the variably increasing volume of water in the chamber 14 progressively flows over the baffle into the chamber 15, and a uniform water level is therefore maintained in the chamber 14 without the employment of float-actuated valves or other moving control devices.

The surplus water flowing over the baffle into the chamber 15, is constantly withdrawn from the latter by the action of the impellers 22, and a predetermined amount of the water is caused to flow through the conduits 46, 47, 48 and the check valve 51 to the boiler feed pipe 19.

The effective service of the apparatus can be readily reduced, if occasion requires, by merely stopping one of the pumps A or B and closing the end ports 43, 49 at the side of the tank adjacent the idle pump. In that event the active pump will function to circulate the water through the active conduit 39 and its associated ejector, and water from the secondary tank will pass through the single open port 49 into the passage 48 on its way to the boiler feed pipe.

The inlet or suction passage to each of the impeller chambers is provided with a suitable shut-off valve 56 by means of which the passage may be closed to permit a pump unit to be dismantled and repaired, if necessary, without interfering with the operation of its companion unit.

The standard 12 is preferably a hollow standard, the upper end of which opens into the conduits 45 and thus permits the water of condensation, as well as particles of foreign matter that may have escaped through the strainer 42, to drain into the standard. This standard is provided in its lower portion with a suitable opening 53, and cover, to facilitate the removal of the foreign and other accumulations.

From the foregoing it will be seen that my invention is characterized by the employment of two independent water containing chambers in communication with each other at a defined level, and two centrifugal impellers in co-operative relation with the respective chambers. These impellers, either independently assembled in separate casings, or both contained within one casing, are each designed to handle a predetermined amount of water; that is to say, the impeller for supplying the water to the ejector or exhaust nozzle has a predetermined capacity at a certain velocity, and the impeller for supplying the water to the boiler feed pipe has a predetermined capacity and pressure independent of the exhaust impeller. Hence the two impellers perform their respective duties with the highest efficiency, and since they are below the level of the chambers the impellers are always supplied with water and there is no liability of either pump or pump element becoming vapor bound.

In connection with the apparatus hereinbefore described an electric switch 52 under the operation of a float 54 within the secondary chamber may be readily installed to control the operation of the pumps during night service; that is to say, when the water in said chamber drops to or below a certain level the float operates the switch in a manner to stop the motor, and when the water rises to or above such level the float returns the switch to its normally operative condition and starts the motor. In addition, the apparatus may be provided with any usual or approved automatic starter and vacuum regulator 55 for starting and stopping the operation of the apparatus.

It is to be understood that my invention is not limited to the particular details of construction herein disclosed, as the apparatus may be variously modified within the principle of my invention and the scope of the appended claims.

I claim—

1. A vacuum producing apparatus comprising primary and secondary chambers in free communication with each other at a predetermined level, two centrifugal pump elements below the level of the chambers, inlet and outlet water circulation connections between one of said pump elements and the primary chamber, said connections including an ejector leading to the upper part of the chamber, and exhaust connection in communication with the ejector, and discharge connections between the other pump element and the secondary chamber.

2. A vacuum producing apparatus comprising a tank having a vertical baffle wall therein terminating below the top of the tank to provide primary and secondary chambers in free communication with each other above the baffle, two centrifugal pump elements below the level of the tank, inlet and outlet water circulation connections between one of said pump elements and the primary chamber, said connections including an ejector leading to the upper part of the primary chamber, an exhaust connection in communication with the ejector, and discharge connections between the other pump element and the secondary chamber.

3. A vacuum producing apparatus comprising primary and secondary chambers in free communication with each other at a predetermined level, two centrifugal pump elements below the level of the chambers, water circulation connections between one of said pump elements and the primary chamber, said connections including a conduit located beneath the secondary chamber and leading to the primary chamber and including also an ejector leading to the upper part of the primary chamber, an exhaust connection in communication with the ejector, and discharge connections between the other pump element and the secondary chamber.

4. A vacuum producing apparatus comprising primary and secondary chambers in free communication with each other at a predetermined level, four pump elements below the level of the chambers, two conduits including a plurality of ejectors extending therefrom into the upper portion of the primary chamber, operative connections between said conduits and the discharge passages of two of the pump elements, respectively, exhaust conduits leading to the inlets of the respective ejectors, a passage connecting the second-named conduits, valves controlling communication between said passage and the second named conduits respectively, operative connections between the primary chamber and the inlet passages to the said two pump elements, operative connections between the secondary chamber and the inlet passages to the other two pump elements, two conduits in communication with the secondary chamber and with the discharge passages from the two last-named pump elements, a second passage connecting said last-named conduits, valves controlling communication between the second passage and the last-named conduits, and a boiler feed pipe in communication with said second passage.

5. A vacuum producing apparatus comprising a tank having a vertical baffle wall therein terminating below the top of the tank to provide primary and secondary chambers in free communication with each other above the baffle, two centrifugal pump elements below the level of the tank, water circulation connections between one of said pump elements and the primary chamber, said connections including a conduit located beneath the secondary chamber and leading to the primary chamber and including also an ejector leading to the upper part of the chamber, an exhaust connection in communication with the ejector, and discharge connections between the other pump element and the secondary chamber.

6. A vacuum producing apparatus comprising a tank having a vertical baffle wall therein terminating below the top of the tank to provide primary and secondary chambers in free communication with each other above the baffle, four pump elements below the level of the tank, two conduits including ejectors extending therefrom into the upper portion of the primary chamber, operative connections between said conduits and the discharge passages of two of the pump elements, respectively, exhaust conduits leading to the inlets of the respective ejectors, a passage connecting the second-named conduits, valves controlling communication between said passage and the second named conduits respectively, operative connections between the primary chamber and the inlet passages to the said two pump elements, operative connections between the secondary chamber and the inlet passages to the other two pump elements, two conduits in communication with the secondary chamber and with the discharge passages from the last-named two pump elements, a second passage connecting said last-named conduits, valves controlling communication between the second passage and the last-named conduits, and a boiler feed pipe in communication with said second passage.

7. A vacuum producing apparatus comprising primary and secondary chambers, there being an overflow from the primary to the secondary chamber at a predetermined level, a water circulating connection leading from the primary chamber from below the water level therein back to said primary chamber, means in said connection for circulating water, an exhausting connection leading to said circulating means, and means for removing water from the secondary chamber.

Signed at the city of New York in the county and State of New York this 7th day of October A. D. 1925.

CHARLES F. AMES.